(12) United States Patent
Tsujihara et al.

(10) Patent No.: US 12,344,484 B2
(45) Date of Patent: Jul. 1, 2025

(54) COMPONENT FEEDER AND COMPONENT FEEDING METHOD

(71) Applicant: Konica Minolta, Inc., Tokyo (JP)

(72) Inventors: Kiyohito Tsujihara, Toyokawa (JP); Takumi Sakurada, Hachioji (JP); Yuki Higuchi, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 196 days.

(21) Appl. No.: 18/137,678

(22) Filed: Apr. 21, 2023

(65) Prior Publication Data

US 2023/0382656 A1 Nov. 30, 2023

(30) Foreign Application Priority Data

May 31, 2022 (JP) ................................ 2022-088161

(51) Int. Cl.
*B65G 47/24* (2006.01)
*B65G 1/137* (2006.01)
*B65G 43/08* (2006.01)

(52) U.S. Cl.
CPC ............. *B65G 47/24* (2013.01); *B65G 1/137* (2013.01); *B65G 43/08* (2013.01); *B65G 2203/0225* (2013.01); *B65G 2203/0283* (2013.01); *B65G 2203/044* (2013.01)

(58) Field of Classification Search
CPC ........................ B65G 2203/0225; B65G 43/08; B65G 1/137; B65G 47/24
USPC .......................................................... 198/382
See application file for complete search history.

(56) References Cited

U.S. PATENT DOCUMENTS

| | | | | |
|---|---|---|---|---|
| 8,136,651 | B2 * | 3/2012 | Cassoni | B67B 3/0645 198/408 |
| 10,804,123 | B2 * | 10/2020 | Junker | H05K 13/0413 |
| 12,017,898 | B2 * | 6/2024 | Mauriz-Barcos | B67B 3/0645 |
| 2018/0154443 | A1 * | 6/2018 | Milshtein | B22F 12/41 |
| 2022/0371830 | A1 * | 11/2022 | Faieta | B65G 47/244 |
| 2023/0242353 | A1 * | 8/2023 | Tondreau, III | B65G 47/8892 198/459.6 |

FOREIGN PATENT DOCUMENTS

| | | | |
|---|---|---|---|
| JP | 2012-192478 A | | 10/2012 |
| KR | 20120058094 | * | 6/2012 |
| TW | 201721319 | * | 6/2017 |
| TW | 1698946 | * | 7/2020 |

* cited by examiner

*Primary Examiner* — Gene O Crawford
*Assistant Examiner* — Lester Rushin, III
(74) *Attorney, Agent, or Firm* — RANKIN, HILL & CLARK LLP

(57) ABSTRACT

A component feeder includes: a component housing that stores a plurality of components; a plurality of orientation adjusters that adjusts an orientation of the components housed in the component housing; and a first hardware processor that controls driving of the plurality of orientation adjusters based on component information related to the components housed in the component housing.

19 Claims, 9 Drawing Sheets

COMPONENT FEEDER AND COMPONENT FEEDING METHOD

The entire disclosure of Japanese patent Application No. 2022-088161, filed on May 31, 2022, is incorporated herein by reference in its entirely.

BACKGROUND

Technological Field

The present invention relates to a component feeder and a component feeding method.

Description of the Related Art

As a technique related to a component feeder that retrieves a small quantity of components from a piled component group and feeds the components to a predetermined position, there is a technique disclosed in JP 2012-192478 A. JP 2012-192478 A discloses a configuration in which, when a three-dimensional information processor of a component position and orientation recognizer cannot recognize a position and orientation of components at the time of retrieving the components, a housing container body is rotated on the basis of a preset rotation operation, a vibrator is driven to vibrate a container bottom for a predetermined time, and a piled state is changed so that a position and an orientation of the piled components can be recognized.

However, since the three-dimensional information processor of the component feeder described above only recognizes the position and orientation of components, when the shape of the components to be handled changes, it has been difficult to change the piled state only by a preset operation in some cases. Therefore, the shape of components that can be efficiently retrieved from a piled component group and fed has been limited.

SUMMARY

Therefore, an object of the present invention is to provide a component feeder and a component feeding method that facilitate efficient retrieval of a component regardless of a component shape, and thus improve versatility.

To achieve the abovementioned object, according to an aspect of the present invention, component feeder reflecting one aspect of the present invention comprises: a component housing that stores a plurality of components; a plurality of orientation adjusters that adjusts an orientation of the components housed in the component housing; and a first hardware processor that controls driving of the plurality of orientation adjusters based on component information related to the components housed in the component housing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of a component feeder and a component feeding method of the present invention will be described with reference to the drawings. However, the scope of the invention is not limited to the disclosed embodiments.

<<Component Feeder>>

Figure 1:
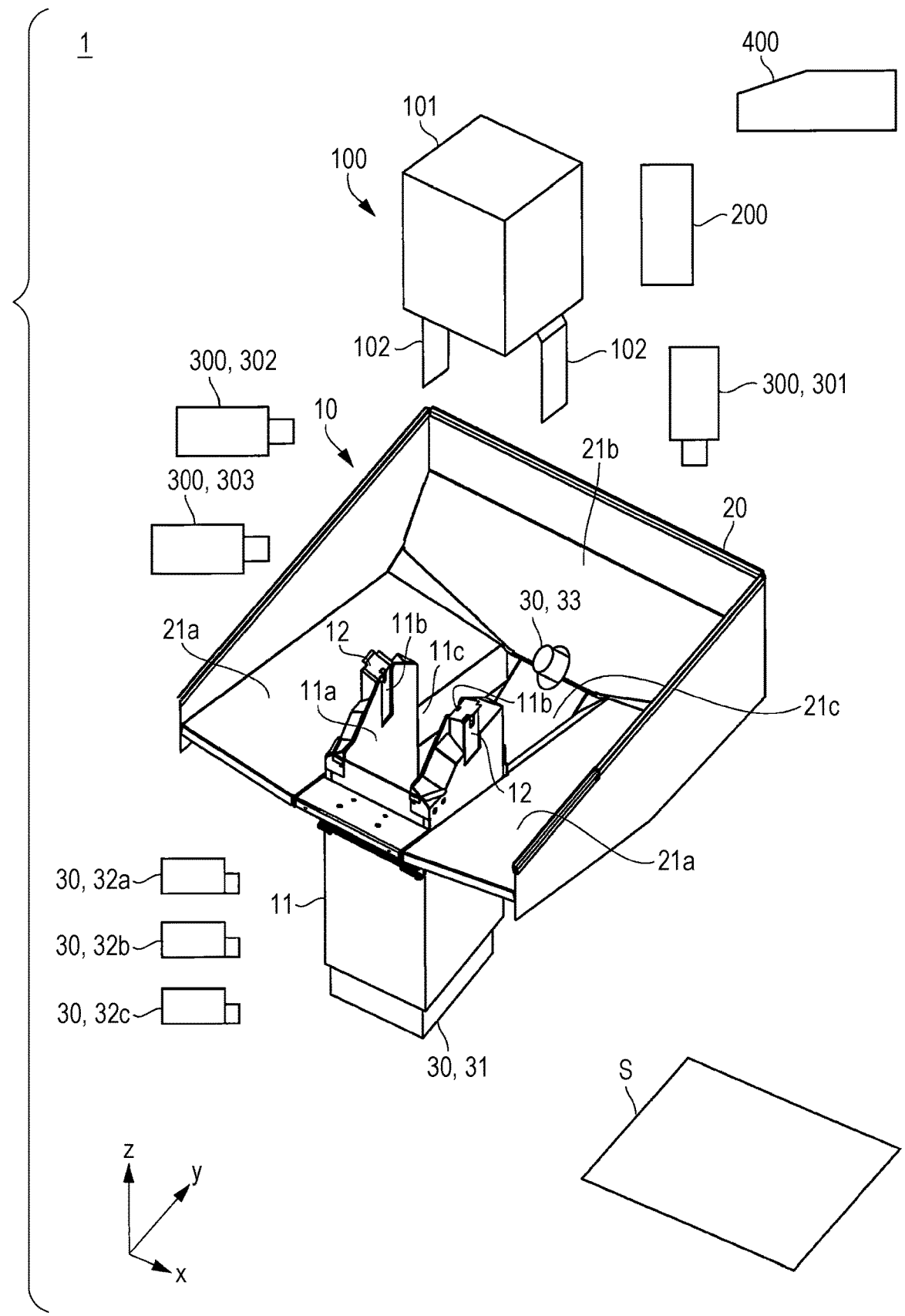
FIG. 1 is a perspective view of a component feeder according to an embodiment.

FIG. 1 is a perspective view of a component feeder according to an embodiment. A component feeder 1 shown in this drawing is intended to retrieve one or a plurality of components from a component group in which a large quantity of components are stacked and feed the components to a predetermined position [S]. The component feeder 1 includes a component storage 10, a component retriever 100, a controller 200, various sensors 300, and an operation part 400. Each configuration of the above will be described below, <Component Storage 10>

Figure 2:
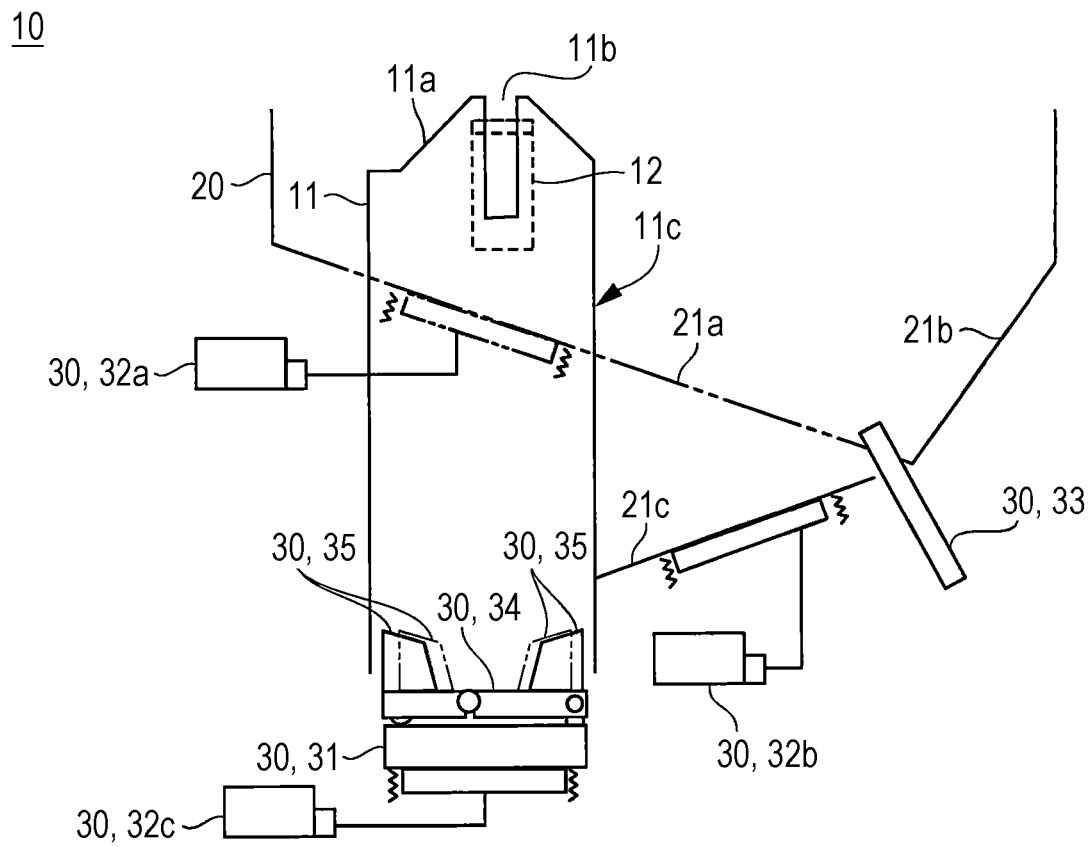
FIG. 2 is a side view (1) of a main section of the component feeder according to the embodiment.
Figure 3:
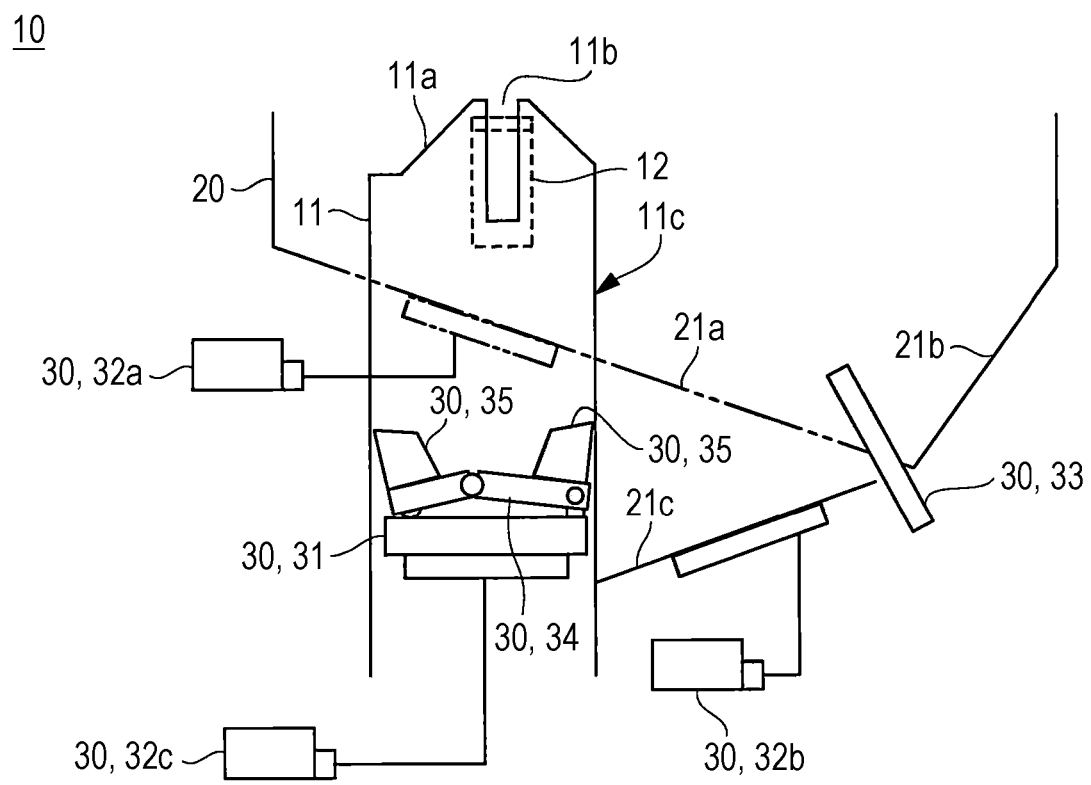
FIG. 3 is a side view (2) of the main section of the component feeder according to the embodiment.
Figure 3:
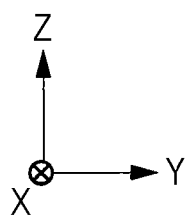

FIGS. 2 and 3 are side views (1) and (2) of a main part of the component feeder according to the embodiment, and are views of the component storage 10 shown in FIG. 1 as viewed from an x direction. The component storage 10 shown in FIGS. 1 to 3 stores a large quantity of components, and includes a storage tower 11, a storage tray 20, and a plurality of orientation adjusters 30. The description of the above is as follows.

[Storage Tower 11]

The storage tower 11 is a cylindrical container constituting a component housing for housing components together with the storage tray 20 to be described next. The storage tower 11 is formed by erecting a cylindrical member, and an upper opening is a component retrieval opening 11a. The storage tower 11 includes slit openings 11b continuous from the retrieval opening 11a in two opposing side peripheral walls. Since each of the slit openings 11b is provided with a shutter 12 to be described next, it is not necessary to consider falling of a component from the slit opening 11b. Therefore, the opening width and height of each slit opening 11b with respect to a size of the component are not limited.

The storage tower 11 includes a loading opening 11c for loading components into the storage tower 11 at a position independent of the two slit openings 11b in the side peripheral wall. Furthermore, a lower opening of the storage tower 11 is closed by an elevator 31 which is one of the orientation adjusters 30 described below, and the elevator 31 constitutes a floor surface. As a result, the floor surface of the storage tower 11 moves up and down, and the height of the floor surface is variable.

Furthermore, in the storage tower 11, the upper edges of the two side surfaces on which the slit openings 11b are disposed have shapes obliquely cut toward both sides with the arrangement places of the slit opening 11b as the highest part. As a result, it is configured to prevent interference of the storage tower 11 when the component retriever 100 to be described next moves.

The shutter 12 provided on each of the slit openings 11b of the storage tower 11 freely opens and closes each of the two slit openings 11b. The shutter 12 is disposed to cover each slit opening 11b from outside of the storage tower 11, and moves up and down along the side surface of the storage tower 11 to open and close the slit opening 11b.

The shutter 12 is pushed downward by a hand 102 (shown only in FIG. 1) of the component retriever 100 to be described next, and moves downward in conjunction with lowering of the hand 102 to open the slit opening 11b. The shutter 12 releases a downward pushing pressure and moves upward to close the slit opening 11b. The shutter 12 includes, for example, a flange provided to protrude outward from an upper edge, and moves downward in conjunction with lowering of the hand 102 when the hand 102 of the component retriever 100 pushes the flange downward.

Note that the shutter 12 may include a drive unit, and in this case, in accordance with an instruction from the controller 200 (shown only in FIG. 1) described later, the shutter moves downward in conjunction with lowering of the hand 102 to open the slit opening 11b. As long as the shutter 12 opens the slit opening 11b in conjunction with lowering of the hand 102, the shutter is not limited to move up and down, and may be, for example, a double shutter.

[Storage Tray 20]

The storage tray 20 constitutes the component housing for housing components together with the storage tower 11, and allows components to flow into the storage tower 11 from the loading opening 11c of the storage tower 11. The storage tray 20 is a wide-mouth container for efficiently introducing components into the storage tower 11. This storage tray 20 is disposed around the storage tower 11 and has an inclined bottom surface inclined toward the lower end of the loading opening 11c of the storage tower 11. Here, as an example, an inclined bottom surface having a shape surrounding the storage tower 11 is shown in consideration of compactness of the component storage 10. As a result, space saving of the component feeder 1 can be achieved. The inclined bottom surfaces are, for example, two first inclined bottom surfaces 21a, a second inclined bottom surface 21b, and a third inclined bottom surface 21c.

The two first inclined bottom surfaces 21a are disposed to sandwich the storage tower 11 at positions sandwiching the surface of the storage tower 11 provided with the loading opening 11c. The second inclined bottom surface 21b is disposed to face the loading opening 11c of the storage tower 11, and is inclined toward the lower ends of the two first inclined bottom surfaces 21a. The third inclined bottom surface 21c is disposed continuously from the lower end of the second inclined bottom surface 21b at a position sandwiched between the two first inclined bottom surfaces 21a, and is provided so as to be inclined toward the lower end of the loading opening 11c.

The storage tray 20 is configured such that components fed into a tray slide down on the two first inclined bottom surfaces 21a and the second inclined bottom surface 21b to be fed to the third inclined bottom surface 21c, and further slide down on the third inclined bottom surface 21c to flow into the storage tower 11 from the loading opening 11c.

[Orientation Adjuster 30]

The orientation adjuster 30 adjusts the orientation of a large quantity of components housed in the storage tower 11 and the storage say 20, and is provided in each of the storage tower 11 and the storage tray 20. The orientation adjusters 30 include the elevator 31, vibrator 32a, 32b, and 32c a rectifier rod 33, a bottom surface changer 34 (shown only in FIGS. 2 and 3), and a side wall changer 35 (shown only in FIGS. 2 and 3). All types of the orientation adjusters 30 may be provided in the component housing configured by the storage tower 11 and the storage tray 20, but at least two orientation adjusters 30 of the same type or different types are provided. Hereinafter, each of the orientation adjusters 30 will be described.

—Elevator 31—

The elevator 31 raises and lowers a bottom surface of the component housing configured by the storage tower 11 and the storage tray 20. Here, the elevator 31 constitutes a bottom of the storage tower 11 as an example, and can be raised and lowered freely in the storage tower 11 using the storage tower 11 as a traveling path. The elevator 31 feeds a large quantity of components housed in the storage tower 11 to the height of the slit opening 11b of the storage tower 11 by raising and lowering the bottom of the storage tower 11, and swings the components in the storage tower 11 to adjust the orientation of the components. An elevator may also be provided on a bottom surface of the storage tray 20.

—Vibrators 32a, 32b, 32c—

The vibrators 32a, 32b, and 32c vibrate the component housing configured by the storage tower 11 and the storage tray 20, and are, for example, vibration motors. The vibrators 32a, 32b, and 32c are, for example, a vibrator 32a that vibrates the first inclined bottom surface 21a, a vibrator 32b that vibrates the third inclined bottom surface 21c, and a vibrator 32c that vibrates the bottom surface of the storage tower 11. The vibrators 32a, 32b, and 32c individually vibrate the bottom surfaces of the parts of the storage tower 11 and the storage tray 20 to adjust the orientation of a large quantity of housed components. The vibrator may vibrate side walls of the storage tower 11 and the storage tray 20.

—Rectifier Rod 33—

The rectifier rod 33 is provided so as to protrude freely from a wall of the component housing configured by the storage tower 11 and the storage tray 20. Here, as an example, a state is shown in which the rectifier rod 33 is provided so as to protrude freely from a wall near a boundary between the second inclined bottom surface 21b and the third inclined bottom surface 21c in the storage tray 20. The rectifier rod 33 moves a large quantity of components housed in the storage tray 20 by protruding into the storage tray 20 to adjust the orientation of the components, and facilitates introduction of the components into the storage tower 11. A plurality of rectifier rods 33 may be provided with respect to the storage tray 20, and may be additionally provided so as to protrude from the bottom surface of the storage tower 11.

—Bottom Surface Changer 34 (Shown Only in FIGS. 2 and 3)—

The bottom surface changer 34 changes the shape of the bottom surface of the component housing configured by the storage tower 11 and the storage tray 20. Here, as an example, the bottom surface changer 34 is configured to freely change the inclination of the bottom surface by freely bending the bottom surface of the storage tower 11. By inclining the bottom surface of the storage tower 11 by bending (see FIG. 3) and returning the bottom surface to a flat state (see FIG. 2), the bottom surface changer 34 moves the components housed in the storage tower 11 to adjust the orientation of the components. Note that the bottom surface changer 34 may be provided on each bottom surface of the storage tray 20.

—Side Wall Changer 35 (Shown Only in FIGS. 2 and 3)—

The side wall changer 35 is a mechanism that changes a side wall near the bottom surface of the storage tower 11. The side wall changer 35 can change a distance between a pair of inclined side wall members erected on the bottom surface of the storage tower 11, for example. The side wall changer 35 changes the shape of the side wall near the bottom surface of the storage tower 11 to move the components housed in the storage tower 11 and adjust the orientation of the components.

<Component Retriever 100>

With reference to FIG. 1, the component retriever 100 is intended to retrieve one or a plurality of components from among the large quantity of components stored in the storage tower 11 of the component storage and feed the components to the predetermined position [S]. The component retriever 100 includes a robot arm 101 and the hand 102. Each configuration of the above will be described below

[Robot Arm 101]

The robot arm 101 holds the hand 102 at the distal end. Although only the distal end of the robot arm 101 is shown in the drawing, the robot arm 101 freely moves the held hand 102 in the x direction, a y direction, and a z direction. The robot arm 101 may have a mechanism that rotates the held hand 102 and further controls the direction of the hand 102.

[Hand 102]

The hand 102 is held by the distal end of the robot arm 101 in a state of protruding from the distal end of the robot arm 101, and operates to hold a component and release the held component. The hand 102 works, for example, in a pair being disposed opposite to each other as shown in the drawing.

The pair of hands 102 is disposed such that wide surfaces having a substantially flat plate shape face each other, and the distal ends of the hands 102 are openable and closable by an operation of approaching or separating from each other at the distal ends protruding from the robot arm 101. The distance between the distal ends of the pair of hands 102 in an open state is slightly larger than the distance between the two slit openings 11b in the storage tower 11. As a result, when the robot arm 101 lowers the hands 102 from above the storage tower 11, the distal ends of the hands 102 can press the upper end of the shutters 12 downward, and the shutters 12 can be moved downward to release each slit opening 11b of the storage tower 11. In this state, the hands 102 are disposed to face the slit openings 11b of the storage tower 11, and the hands 102 close the slit openings 11b. Note that the pair of hands 102 is configured to operate to such an extent that the distal ends are in contact with each other with the distal ends closed.

Each of the pair of hands 102 has a width smaller than the opening width a the slit opening 11b of the storage tower 11. As a result, the distal ends of the hands 102 are inserted into the storage tower 11 from the two slit openings 11b released by the shutters 12. Then, by bringing the distal ends of the pair of hands 102 close to each other in the storage tower 11 to be in a closed state, the component in the storage tower 11 can be held between the pair of hands 102.

The pair of hands 102 disposed opposite to each other holds the component between the pair of hands 102 by bringing the distal ends close to each other. In this case, the distal ends of the hands 102 are brought into contact with each other, and the component is held on the inner periphery of the pair of hands 102. The hands 102 hold the component by sandwiching the component between the distal ends. In addition, the hands 102 hold the component while sandwiching the component between the distal ends, and further hold the component on the inner periphery.

The hands 102 are pulled up from the storage tower 11 above by the robot arm 101 in a state of holding the component to retrieve the component from the retrieval opening 11a of the storage tower 11. In addition, the hands 102 release the held component by opening between the distal ends, and place the component at the predetermined position [S].

<Controller 200>

The controller 200 controls driving of the orientation adjusters 30 in the component storage 10 and driving of the robot arm 101 and the hands 102 in the component retriever 100 on the basis of information from the various sensors 300 and the operation part 400. The controller 200 retrieves one or a plurality of components from among the large quantity of components stored in the storage tower 11 of the component storage 10 and feeds the components to the predetermined position [S].

The controller 200 is configured by a calculator. The calculator is hardware used as a so-called computer. The calculator includes a non-volatile memory such as a central processing unit (CPU), a random access memory (RAM), or a read only memory (ROM).

Figure 4:
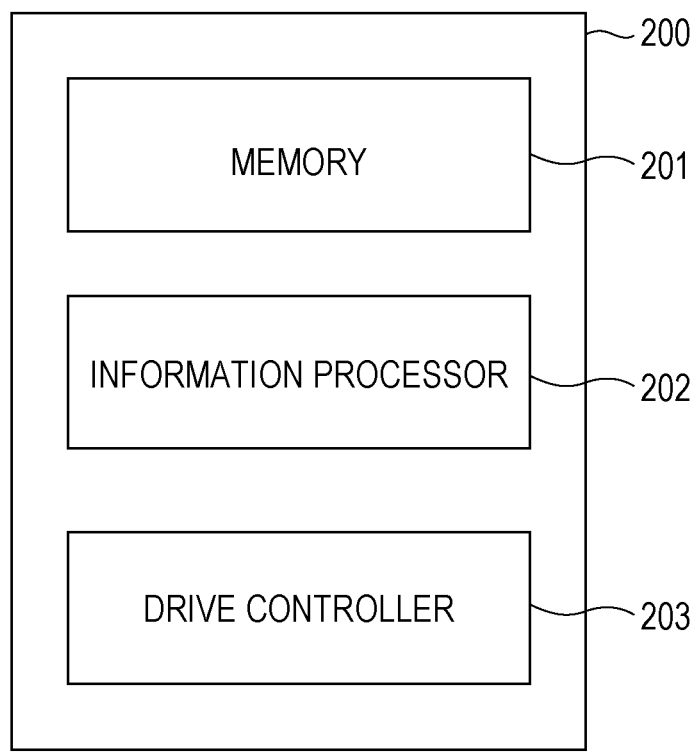
FIG. 4 is a diagram showing a configuration of a controller of the component feeder according to the embodiment.

FIG. 4 is a diagram showing a configuration of the controller 200 of the component feeder according to the embodiment. As shown in this drawing, the controller 200 configured by a calculator includes a memory 201, an information processor 202, and a drive controller 203.

The memory 201 stores a plurality of adjustment programs for driving the orientation adjusters 30. The adjustment programs include control parameters such as timing to drive each orientation adjuster and intensity and time to dive each orientation adjuster. The adjustment programs are stored in the memory 201 in association with each classification obtained by classifying component information owned by the component. The component information is, for example, a size of the component, and is, for example, a maximum length [l] of the component.

The information processor 202 determines the component classification handled by the component feeder 1 on the basis of the component information from the various sensors 300 and the operation part 400 shown in FIG. 1, and extracts an adjustment program based on determination from among the adjustment programs stored in the memory 201.

The drive controller 203 controls driving of the orientation adjusters 30 in the component storage 10 and driving of the robot arm 101 and the hands 102 in the component retriever 100 on the basis of the adjustment program extracted by the information processor 202.

The drive control of the orientation adjusters 30, the robot arm 101, and the hands 102 by the controller 200 will be described in detail in the following description of the component feeding method, <Various Sensors 300>

With reference to FIG. 1 again, the various sensors 300 include an image sensor 301, a safety sensor 302, and a height sensor 303. The description of the above is as follows.

[Image Sensor 301]

The image sensor 301 is intended to detect the position and orientation of the component storage 10 and the position and orientation of the component retriever 100 with respect to the predetermined position [S] for feeding components. The image sensor 301 may be used to detect a shape of a component for specifying the component information of the component handled by the component feeder 1. Furthermore, the image sensor 301 is also used as a sensor for detecting a remaining quantity of components housed in the storage tower 11 or a feeding quantity of components to the predetermined position [S]. The image sensor 301 is, for example, an image recognizer including a camera. The image sensor 301 transmits the detected information to the controller 200.

[Safety Sensor 302]

The safety sensor 302 is intended to detect a component located in the retrieval opening 11a of the storage tower 11. The safety sensor 302 is, for example, a transmissive photosensor including a light emitting element that emits inspection light in parallel with the retrieval opening 11a at a height near the upper end of the retrieval opening 11a and a plurality of light receiving elements (not shown) that receives the inspection light from the light emitting element. A signal from the safety sensor 302 is transmitted to the controller 200 as information for confirming a housing state of the components in the storage tower 11.

<Height Sensor 303>

The height sensor 303 is intended to detect a feeding height of components in the component housing configured by the storage tower 11 and the storage tray 20, and is also used as a sensor for detecting a remaining quantity of components housed in the storage tower 11. The height sensor 303 is, for example, a line sensor arranged in a longitudinal direction of the side walls of the storage tray 20. A signal from the height sensor 303 is transmitted to the controller 200 as information for confirming the feeding height of the components in the component housing configured by the storage tower 11 and the storage tray 20.

<Operation Part 400>

The operation part 400 is a portion for inputting an instruction for component feeding by the component feeder 1, various settings, and component information on the components handled by the component feeder 1. The information input from the operation part 400 is transmitted to the controller 200.

<<Component Feeding Method>>

Figure 5:
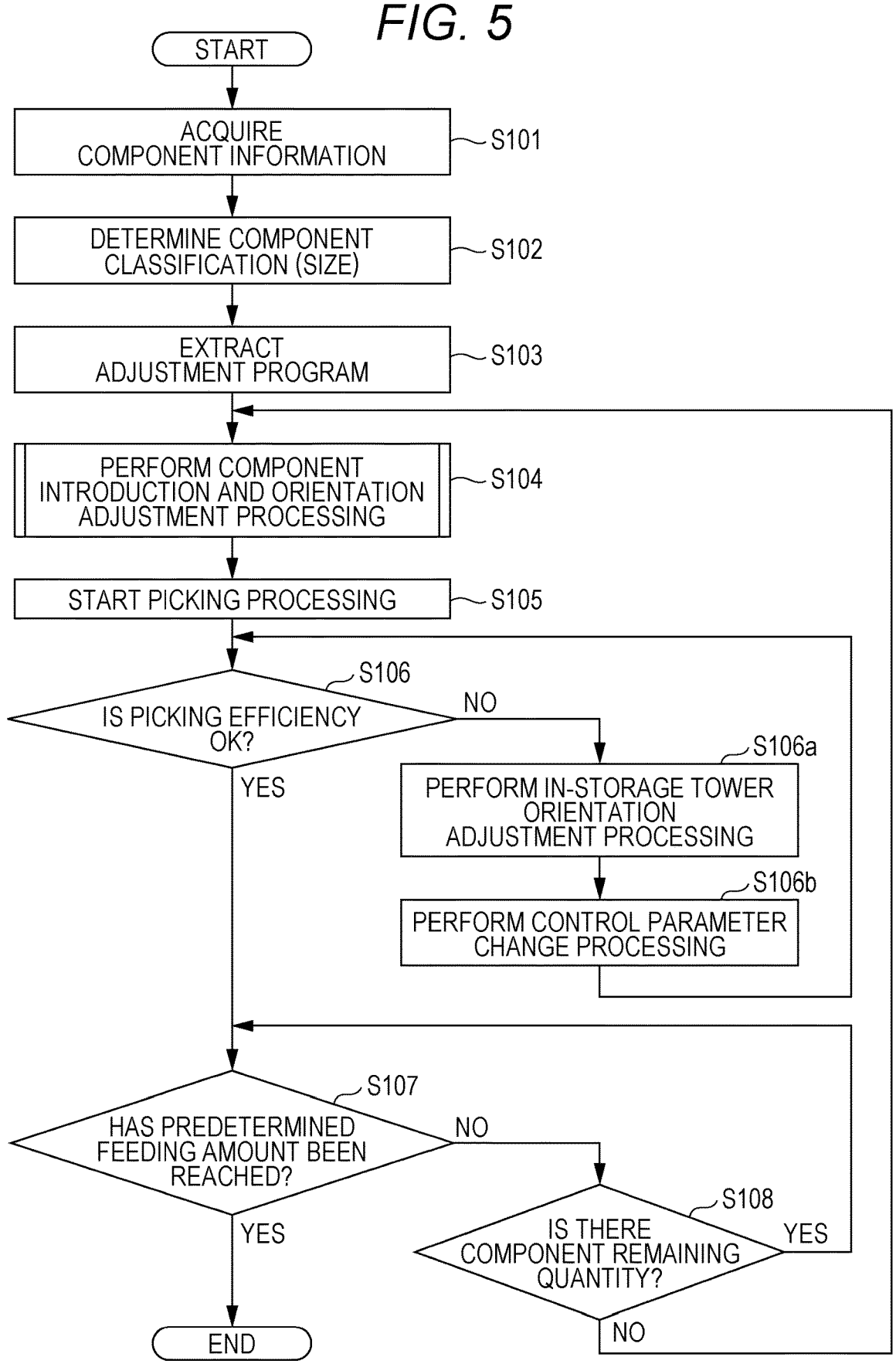
FIG. 5 is a flowchart of a component feeding method according to the embodiment.

FIG. 5 is a flowchart of the component feeding method according to the embodiment. The component feeding method described with reference to this drawing is a component feeding method implemented by a component feeding program included in the controller 200 (see FIGS. 1 and 4) described above. Hereinafter, the component feeding method by the component feeder 1 will be described in the order shown in FIG. 5 with reference to FIGS. 1 to 4 described above. Note that the flow shown in FIG. 5 is started when the start of component feeding from the operation part 400 is input.

<Step S101>

In step S101, the information processor 202 acquires component information on the components handled by the component feeder 1. The information processor 202 acquires the component information by an input from the operation part 400 or analyzes a signal from the image sensor 301 to specify the component information. The component information acquired here is, for example, a size of the component, and here, is, for example, the maximum length [l] of the component.

<Step S102>

In step S102, on the basis of the acquired component information, the information processor 202 determines to which classification the size of the component handled by the component feeder 1 belongs. As an example, the information processor 202 determines which one of three classifications of [large], [medium], and [small] the component is, for each size of the component with respect to the size of the storage tower 11. Specifically, the component classification is determined according to the following table on the basis of the relationship between a long side length [a] or an end side length [b] of the bottom surface of the cylindrical shape of the storage tower 11 and the maximum length [l] of the component.

TABLE 1

| Component Classification | [a] | [b] |
|---|---|---|
| [Large] | $[l] \leq (1/3) \times [a]$ | $[l] \leq (1/2) \times [b]$ |
| [Medium] | $(1/3) \times [a] < [l] \leq (1/2) \times [a]$ | $(1/2) \times [b] < [l] \leq [b]$ |
| [Small] | $(1/2) \times [a] < [l]$ | $[b] < [l]$ |

Furthermore, the information processor 202 may determine to which size the component belongs for each size of the component with respect to a depth [d] of the storage tower 11. As a specific example in this case, it is determined whether the maximum length [l] of the component is more than half of the depth [d] of the storage tower 11 ($[l] > (1/2) \times [d]$). Here, the depth [d] of the storage tower 11 is the depth from a connection point with the storage tray 20, and is the size when the elevator 31 is lowered to the deepest position.

<Step S103>

In step S103, the information processor 202 extracts the adjustment program stored in the memory 201 on the basis of the component classification determined in step S102. Here, an adjustment program associated with the component classification is stored in the memory 201.

<Step S104>

In step S104, the drive controller 203 performs component introduction and orientation adjustment processing based on the adjustment program extracted in step S103. The component introduction and orientation adjustment processing performed here is processing performed before picking processing of the component so that the component can be efficiently retrieved from the storage tower 11 by the component retriever 100. Here, the picking processing is processing of retrieving a component in the storage tower 11 and feeding the component to the position [S] for processing by driving the component retriever 100.

At this time, the drive controller 203 performs the component introduction and orientation adjustment processing by controlling the drive of the orientation adjuster 30 in the component storage 10 in accordance with the extracted adjustment program. Hereinafter, the component introduction and orientation adjustment processing performed by the drive controller 203 will be described in the order of the cases where the component classification is [small], [medium], and [large]. The procedure described below shows a case where the elevator 31 shown in FIGS. 2 and 3 is located in an upper part of the storage tower 11 and is started from a state where a large quantity of components are loaded into the storage tray 20, (Component Introduction and Orientation Adjustment Processing for Component [Small])

Figure 6:
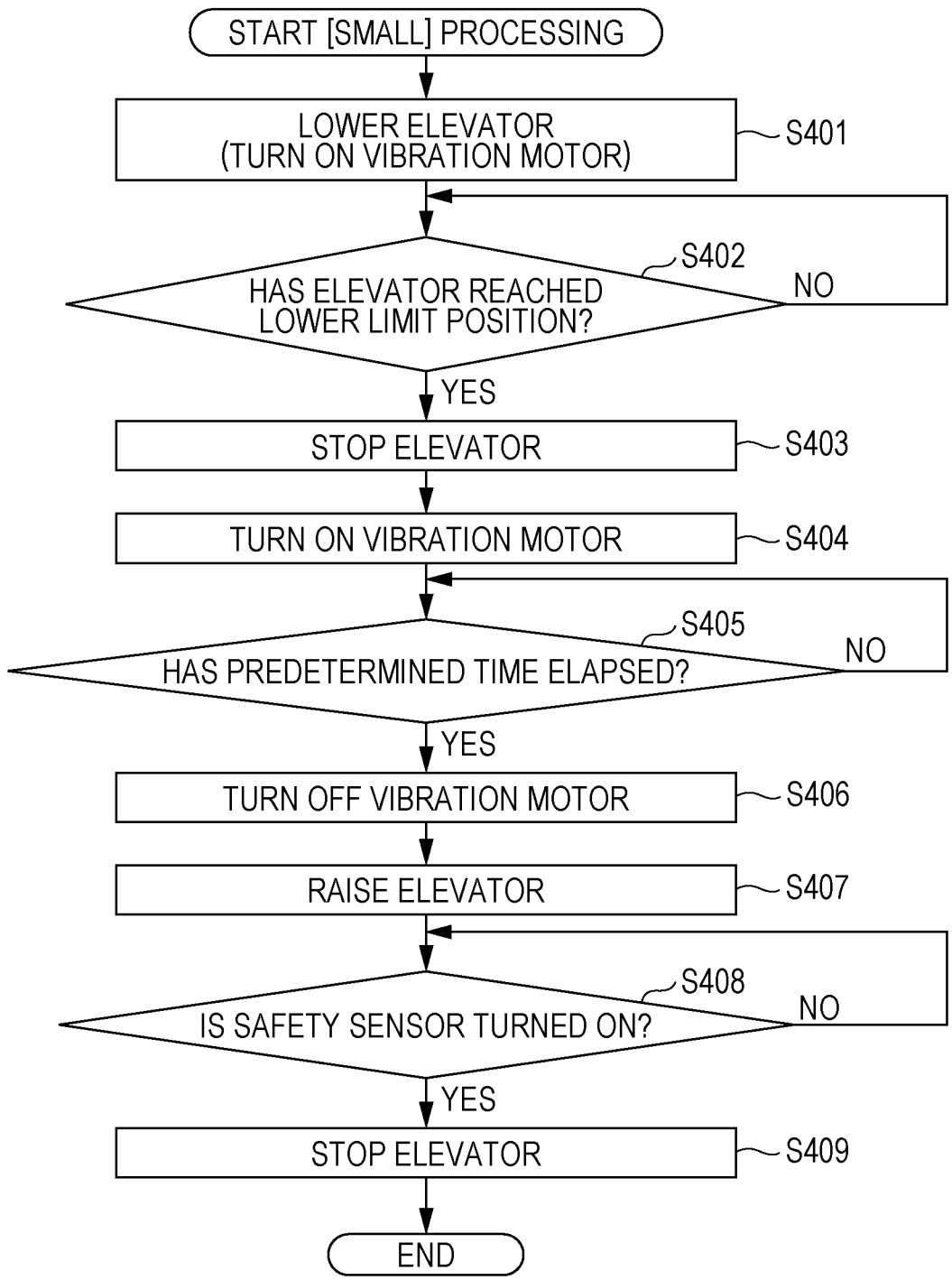
FIG. 6 is a flowchart of first component introduction and orientation adjustment processing in the component feeding method according to the embodiment.

FIG. 6 is a flowchart of first component introduction and orientation adjustment processing in the component feeding method according to the embodiment. Hereinafter, with reference to FIGS. 1 to 4, a procedure of the component introduction and orientation adjustment processing performed by the drive controller 203 when the component classification is determined to be [small] in accordance with the procedure shown in FIG. 6 will be described.

[Step S401]

In step S401, the drive controller 203 lowers the elevator 31 of the orientation adjuster 30. As a result, a plurality of components flows are introduced from the storage tray 20 into the storage tower 11. In step S401, the vibrators 32a, 32b, and 32c may be driven, which facilitates introduction of components into the storage tower 11. At this time, the intensity of each of the vibrators 32a, 32b, and 32c is a preset magnitude with respect to the component classification [small]. Note that, in a case where the component feeder 1 includes the side wall changer as the orientation adjuster 30, the drive controller 203 moves the side wall changer 35 to a position set in a case where the component classification is [small] before lowering the elevator 31.

[Step S402]

In step S402, the drive controller 203 determines whether the elevator 31 reaches a predetermined lower limit position, and when it is determined that the elevator has reached the lower limit position (YES), the processing proceeds to the next step S403. Here, the lower limit position of the elevator 31 is a value set for each size of the component with respect to the depth [d] of the storage tower 11. For example, when the maximum length [l] of the component is half or less of the depth of the storage tower 11 ([l]≤(½)×[d]), the lower limit position of the elevator 31 is up to the maximum depth [d].

[Step S403]

In step S403, the drive controller 203 stops lowering of the elevator 31.

[Step S404]

In step S404, the drive controller 203 starts driving the vibrators 32a, 32b, and 32c. At this time, the intensity of each of the vibrators 32a, 32b, and 32c is a preset magnitude with respect to the component classification [small]. Note that, in step S401, in a case where the driving of the vibrators 32a, 32b, and 32c has already been started, the driving of the vibrators 32a, 32b, and 32c is continued.

[Step S405]

In step S405, the drive controller 203 determines whether a predetermined time has elapsed. Here, the predetermined time is time set in advance for the component classification [small], and is time sufficient for adjusting the orientation of the components in the component housing configured by the storage tower 11 and the storage tray 20 by driving the vibrators 32a, 32b, and 32c. Here, the time sufficient for the components to be adjusted in orientation is time sufficient for the components in the storage tray 20 to effectively flow into the storage tower 11. Furthermore, the time sufficient for the components to be adjusted in orientation is time sufficient for filling gaps between a large quantity of components housed in the storage tower 11 and increasing the density of the components in the storage tower 11. This time is time obtained by an experiment in advance for each component classification, and is similar in other component introduction and orientation adjustment processing.

When the drive controller 203 determines that the predetermined time has elapsed (YES), the processing proceeds to the next step S406.

[Step S406]

In step S406, the drive controller 203 stops the vibrators 32a, 32b, and 32c.

[Step S407]

In step S407, the drive controller 203 raises the elevator 31.

[Step S408]

In step S408, the drive controller 203 determines whether the signal from the safety sensor 302 is turned on. Here, a state where the signal from the safety sensor 302 is turned on indicates a state where a detection light of the safety sensor 302 is blocked, and the detection light is not received by one or a predetermined number of a plurality of light receivers. In this state, it is detected that the components in the storage tower 11 have reached near the upper end of the retrieval opening 11a of the storage tower 11 in which the safety sensor 302 is installed. When the drive controller 203 determines that the signal from the safety sensor 302 is turned on (YES), the processing proceeds to the next step S409.

[Step S409]

In step S409, the drive controller 203 stops raising of the elevator 31. Thus, the component introduction and orientation adjustment processing upon determination that the component classification is [small] ends, and the processing proceeds to step S105 in FIG. 5.

(Component Introduction and Orientation Adjustment Processing for Component [Medium])

Figure 7:
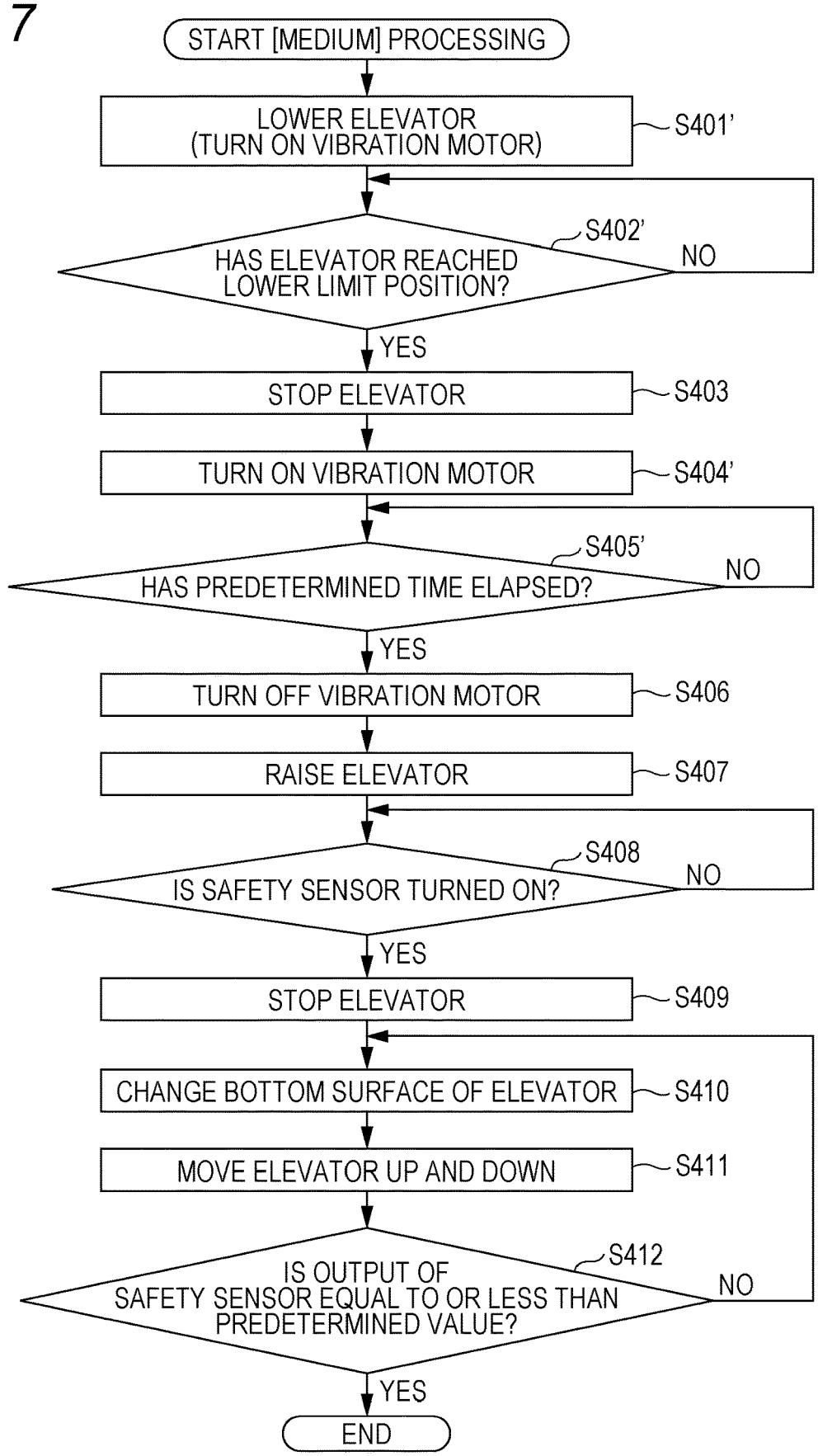
FIG. 7 is a flowchart of second component introduction and orientation adjustment processing in the component feeding method according to the embodiment.

FIG. 7 is a flowchart of second component introduction and orientation adjustment processing in the component feeding method according to the embodiment. Hereinafter, with reference to FIGS. 1 to 4, a procedure of the component introduction and orientation adjustment processing performed by the drive controller 203 when the component classification is determined to be [medium] in accordance with the procedure shown in FIG. 7 will be described. Note that, among the processing shown in FIG. 7, the same processing as the processing upon determination that the component classification shown in FIG. 6 is [small] is denoted by the same step number, and a part of redundant description is omitted.

[Step S401']

In step S401', the drive controller 203 lowers the elevator 31 of the orientation adjuster 30. As a result, a plurality of components flows are introduced from the storage tray 20 into the storage tower 11. In step S401', the vibrators 32a, 32b, and 32c may be driven, which facilitates introduction of components into the storage tower 11. At this time, the intensity of each of the vibrators 32a, 32b, and 32c is a preset magnitude with respect to the component classification [medium].

[Step S402']

In step S402', the drive controller 203 determines whether the elevator 31 has reached a predetermined lower limit position, and when it is determined that the elevator has reached the lower limit position (YES), the processing proceeds to the next step S403. Here, the lower limit position of the elevator 31 is a value set for each size of the component with respect to the depth [d] of the storage tower 11. For example, when the maximum length [l] of the component is half or less of the depth [d] of the storage tower 11 ([l]≤(½)×[d]), the lower limit position of the elevator 31 is up to the maximum depth [d].

[Step S403]

In step S403, the drive controller 203 stops lowering of the elevator 31.

[Step S404']

In step S404', the drive controller 203 starts driving the vibrators 32a, 32b, and 32c. At this time, the intensity of each of the vibrators 32a, 32b, and 32c is a preset magnitude with respect to the component classification [medium]. Note that, in step S401', in a case where the driving of the vibrators 32*a*, 32*b*, and 32*c* has already been started, the driving of the vibrators 32*a*, 32*b*, and 32*c* is continued.

[Step S405']

In step S405', the drive controller 203 determines whether a predetermined time has elapsed. Here, the predetermined time is time set in advance for the component classification [medium], and is time sufficient for adjusting the orientation of the components in the component housing configured by the storage tower 11 and the storage tray 20 by driving the vibrators 32*a*, 32*b*, and 32*c*. When the drive controller 203 determines that the predetermined time has elapsed (YES), the processing proceeds to the next step S406.

[Steps S406 to S409]

In step S406, the drive controller 203 stops the vibrators 32*a*, 32*b*, and 32*c*. Then, in step S407, the drive controller 203 raises the elevator 31. Next, when the drive controller 203 determines in step S408 that the signal from the safety sensor 302 is turned on (YES), the processing proceeds to the next step S409. Subsequently, in step S409, the drive controller 203 stops raising of the elevator 31.

[Step S410]

Thereafter, in step S410, the drive controller 203 bends and changes the bottom surface of the storage tower 11 by driving the bottom surface changer 34 of the orientation adjuster 30. At this time, the drive controller 203 drives the bottom surface changer 34 a preset number of times for the component classification [medium]. The number of times is sufficient for adjusting the orientation of the component of the classification [medium] housed in the storage tower 11.

[Step S411]

In step S411, the drive controller 203 moves the bottom surface of the storage tower 11 up and down by driving the elevator 31 of the orientation adjuster 30. At this time, the drive controller 203 moves the bottom surface of the storage tower 11 up and down by driving the elevator 31 with the magnitude and the number of times set for the component classification [medium]. The magnitude and the number of times are set to be sufficient for the component of the classification [medium] housed in the storage tower 11 to be adjusted in orientation.

[Step S412]

In step S412, the drive controller 203 determines whether output of the signal from the safety sensor 302 is equal to or less than a predetermined value. Here, a state where the output of the signal from the safety sensor 302 is uniform indicates a state where the detection light of the safety sensor 302 is blocked, and the detection light is not received by a predetermined number that is half or more of the plurality of light receivers. In this state, it is detected that only one or a small number of components do not protrude from the retrieval opening 11*a* of the storage tower 11, and a large number of components has reached near the upper end of the retrieval opening 11*a* of the storage tower 11.

When the drive controller 203 determines that the output of the signal from the safety sensor 302 is equal to or less than the predetermined value (YES), the component introduction and orientation adjustment processing ends upon determination that the component classification is [medium], and the processing proceeds to step S105 of FIG. 5.

On the other hand, when the drive controller 203 determines that the output of the signal from the safety sensor 302 is not equal to or less than the predetermined value (NO), the processing returns to step S410 and the subsequent steps are repeated, (Component Introduction and Orientation Adjustment Processing for Component [Large])

Figure 8:
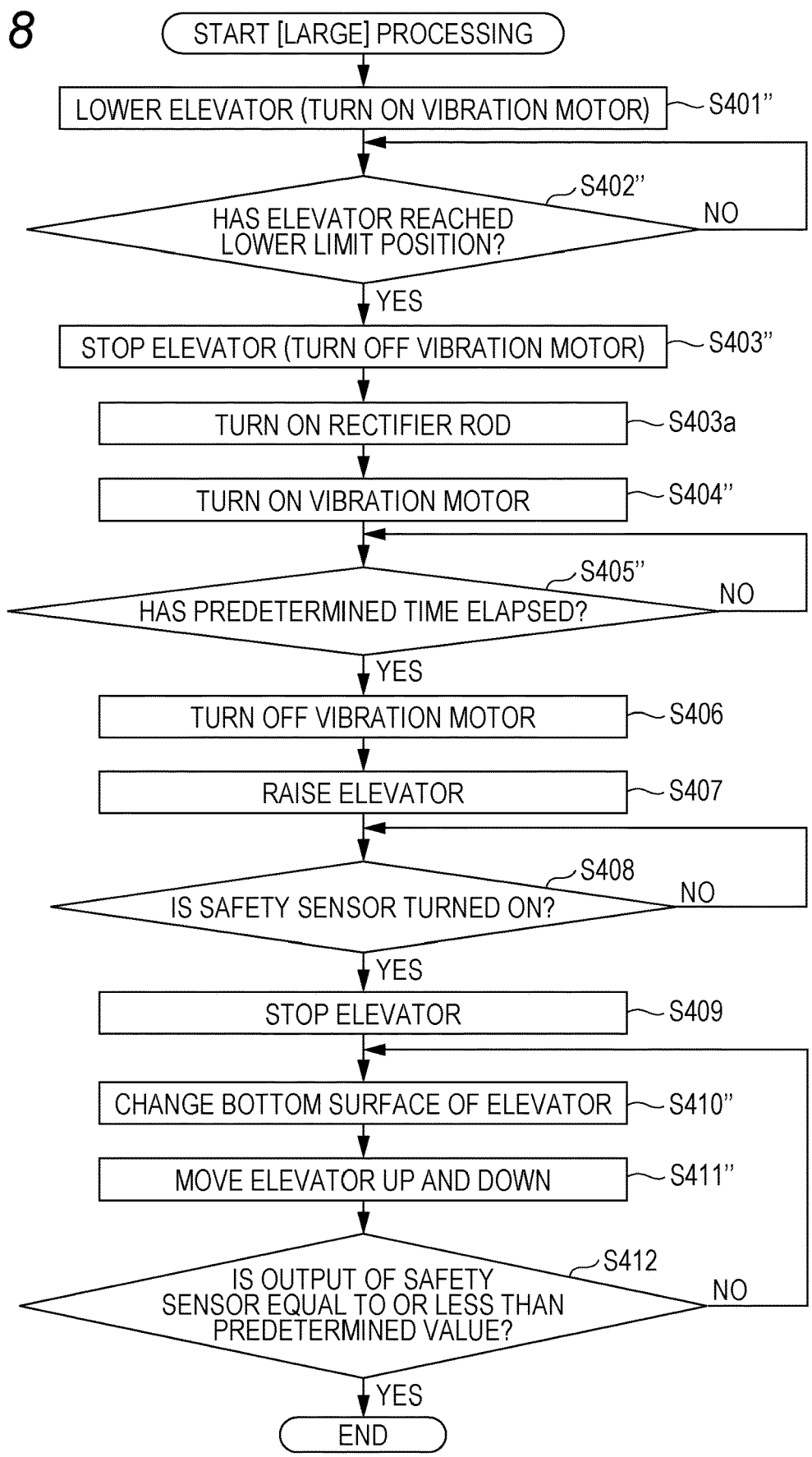
FIG. 8 is a flowchart of third component introduction and orientation adjustment processing in the component feeding method according to the embodiment.

FIG. 8 is a flowchart of third component introduction and orientation adjustment processing in the component feeding method according to the embodiment. Hereinafter, with reference to FIGS. 1 to 4, a procedure of the component introduction and orientation adjustment processing performed by the drive controller 203 when the component classification is determined to be [large] accordance with the procedure shown in FIG. 8 will be described. Note that, among the processing, shown in FIG. 8, the same processing as the processing upon determination that the component classification shown in FIG. 6 is [small] is denoted by the same step number, and a part of redundant description is omitted.

[Step S401"]

In step S401", the drive controller 203 lowers the elevator 31 of the orientation adjuster 30. As a result, a plurality of components flows are introduced from the storage tray 20 into the storage tower 11. In step S401", the vibrators 32*a*, 32*b*, and 32*c* may be driven, which facilitates introduction of components into the storage tower 11. At this time, the intensity of each of the vibrators 32*a*, 32*b*, and 32*c* is a preset magnitude with respect to the component classification [large].

[Step S402"]

In step S402", the drive controller 203 determines whether the elevator 31 has reached a predetermined lower limit position, and when it is determined that the elevator has reached the lower limit position (YES), the processing proceeds to the next step S403". Here, the lower limit position of the elevator 31 is a value set for each size of the component with respect to the depth [d] of the storage tower 11. For example, when the maximum length [l] of the component is larger than half of the depth [d] of the storage tower 11 ([l]>(½)×[d]), the lower limit position of the elevator 31 is a position set at a value smaller than the maximum depth [d].

[Step S403"]

In step S403", the drive controller 203 stops lowering of the elevator 31. At this time, in a case where the vibrators 32*a*, 32*b*, and 32*c* are driven, the driving of the vibrators 32*a*, 32*b*, and 32 *c* is stopped.

[Step S403*a*]

In step S403*a*, the drive controller 203 drives the rectifier rod 33 of the orientation adjuster 30 to take in and out the rectifier rod 33 from the bottom of the storage tray 20. At this time, the drive controller 203 drives the rectifier rod 33 with the magnitude and the number of times set for the component classification [large]. The magnitude and the number of times are set to be sufficient for the component of the classification [large] in the storage tray 20 to be adjusted in orientation and introduced into the storage tower 11.

[Step S404"]

In step S404", the drive controller 203 starts driving the vibrators 32*a*, 32*b*, and 32*c*. At this tithe, the intensity of each of the vibrators 32*a*, 32*b*, and 32*c* is a preset magnitude with respect to the component classification [large].

[Step S405"]

In step S405", the drive controller 203 determines whether a predetermined time has elapsed. Here, time predetermined time is time set for the component classification [large], and is time sufficient for adjusting the orientation of the components in the component housing configured by the storage tower 11 and the storage tray 20 by driving the vibrators 32*a*, 32*b*, and 32*c*. When the drive controller 203 determines that the predetermined time has elapsed (YES), the processing proceeds to the next step S406.

[Steps S406 to S409]

In step S406, the drive controller 203 stops c vibrators 32a, 32b, and 32c. The in step S407, the drive controller 203 raises the elevator 31. Next, when the drive controller 203 determines in step S408 that the signal from the safety sensor 302 is turned on (YES), the processing proceeds to the next step S409. Subsequently, in step S409, the drive controller 203 stops raising of the elevator 31.

[Step S410"]

In step S410", the drive controller 203 bends and changes the bottom surface of the storage tower 11 by driving the bottom surface changer 34 of the orientation adjuster 30. At this time, the drive controller 203 drives the bottom surface changer 34 a preset number of times for the component classification [large]. The number of times is sufficient for adjusting the orientation of the component of the classification [large] housed in the storage tower 11.

[Step S411"]

In step S411, the drive controller 203 moves the bottom surface of the storage tower 11 up and down by driving the elevator 31 of the orientation adjuster 30. At this time, the drive controller 203 moves the bottom surface of the storage tower 11 up and down by driving the elevator 31 with the magnitude and the number of times set for the component classification [large]. The magnitude and the number of times are set to be sufficient for the component of the classification [large] housed in the storage tower 11 to be adjusted in orientation.

[Step S412]

In step S412, the drive controller 203 determines whether output of the signal from the safety sensor 302 is equal to or less than a predetermined value. Here, a state where the output of the signal from the safety sensor 302 is uniform indicates a state where the detection light of the safety sensor 302 is blocked, and the detection light is not received by a predetermined number that is half or more of the plurality of light receivers. In this state, it is detected that only one or a small number of components do not protrude from the retrieval opening 11a of the storage tower 11, and a large number of components has reached near the upper end of the retrieval opening 11a of the storage tower 11.

When the drive controller 203 determines that the output of the signal from the safety sensor 302 is equal to or less than the predetermined value (YES), the component introduction and orientation adjustment processing ends upon determination that the component classification is [large], and the processing proceeds to step S105 of FIG. 5.

On the other hand, when the drive controller 203 determines that the output of the signal from the safety sensor 302 is not equal to or less than the predetermined value (NO), the processing returns to step S410" and the subsequent steps are repeated.

<Step S105>

With reference to FIG. 5 again, after performing the component introduction and orientation adjustment processing in step S104 by any of the above procedures, in step S105, the drive controller 203 starts the picking processing by driving the component retriever 100 (see FIG. 1).

Figure 9A:
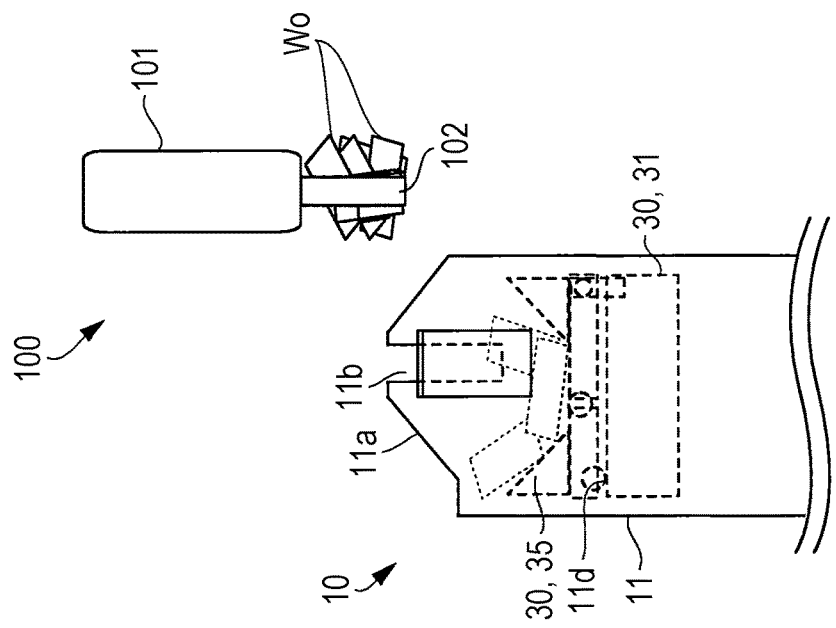
FIGS. 9A to 9C are diagrams for describing picking processing of the component feeder according to the embodiment.
Figure 9B:
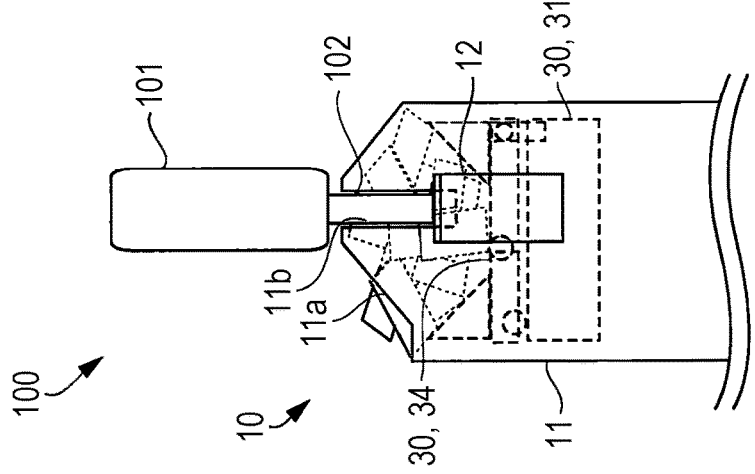
Figure 9C:
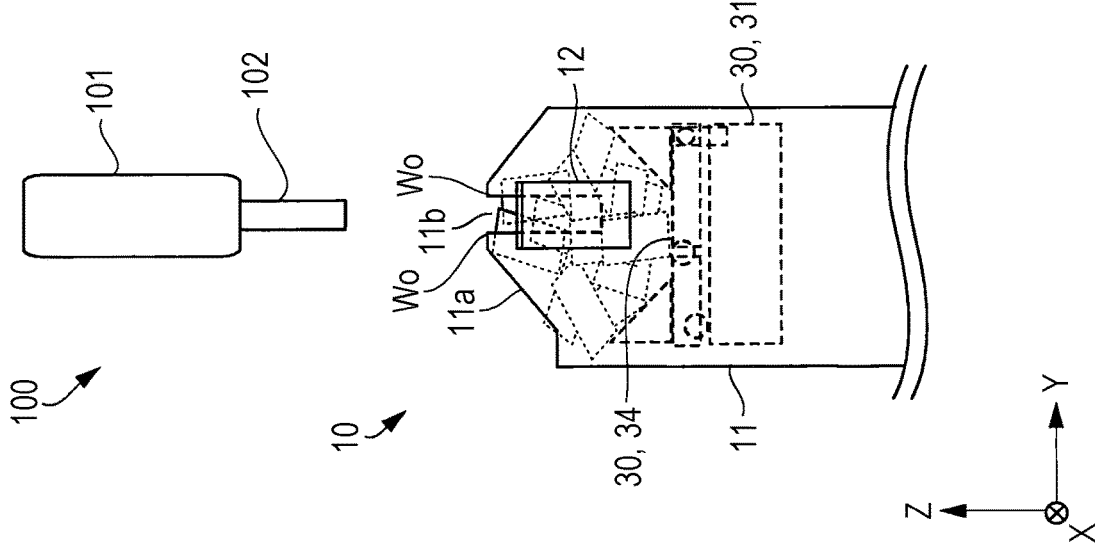

FIGS. 9A to 9C are diagrams for describing the picking processing of the component feeder according to the embodiment, and correspond to diagrams of a main part of FIG. 1 as viewed from the x direction. Hereinafter, a picking operation will be described with reference to FIGS. 9A to 9C.

First, as shown in FIG. 9A, the robot arm 101 moves the hands 102 to above the slit openings 11b of the storage tower 11. In this state, a component [Wo] housed in the storage tower 11 is pushed up to near the upper end of the retrieval opening 11a of the storage tower 11 by any of the component introduction and orientation adjustment processing described above.

Next, as shown in FIG. 9B, the robot arm 101 lowers the hands 102, and pushes down the shutters 12 by each of the hands 102. As a result, the slit openings 11b of the storage tower 11 are opened, and the hands 102 are disposed to face the slit openings 11b. At this time, even when the component [Wo] has a size of a certain degree or more such as the classification [medium] or the classification [large], there is no protrusion of a part of the component [Wo] from the upper edge of the storage tower 11. Therefore, the bottom of the robot arm 101 does not interfere with the component [Wo].

Next, the pair of bands 102 inserts the distal ends of the hands 102 into the storage tower 11 from the slit openings 11b by closing the distal ends close to each other. Then, the hands 102 sandwich and hold the component [Wo] at least between the closed distal ends or on the inner periphery of the two hands 102 with the distal ends closed. Following the operation of the hands 102, the shutters 12 are raised to close the slit openings 11b.

Thereafter, as shown in FIG. 9C, the robot arm 101 pulls up and moves the hands 102 from the retrieval opening 11a of the storage tower 11, and retrieves one or a plurality of components [Wo] gripped by sandwiching between the pair of hands 102 from the storage tower 11. At this time, the robot arm 101 slightly raises the hands 102, and carries the hands 102 out of the storage tower 11 from a low position of the retrieval opening 11a. As a result, the hands 102 gripping the component [Wo] can be carried out of the storage tower 11 through fewer movement paths without greatly raising the component [Wo].

After the above, the robot atm 101 moves the hands 102 to the predetermined position [S] (see FIG. 1). At the movement destination, the hands 102 feed one or the plurality of components [Wo] held by the pair of hands 102 to the predetermined position [S] by separating and opening the distal ends.

With reference to FIG. 5 (see FIGS. 1 to 4) again, at the time of the picking processing started in step S105 described above, the orientation adjustment processing by driving the orientation adjuster 30 installed at least in the storage tower 11 may be performed in parallel. At this time, the drive controller 203 may change a control parameter of the orientation adjuster 30 depending on the remaining quantity of components in the storage tower 11 based on a signal from the image sensor 301 or the height sensor 303, and decrease a drive intensity of the orientation adjuster 30 as the remaining quantity decreases.

<Step S106>

With reference to FIG. 5 again, in step S106, the information processor 202 determines whether the picking processing is efficiently performed. At this time, the information processor 202 calculates the feeding quantity of the component [Wo] to the predetermined position [S] with respect to the number of times of picking or the processing time, or the remaining quantity of the component [Wo] in the storage tower 11 on the basis of, for example, information from the image sensor 301 (see FIG. 1). Then, it is determined whether the picking processing is efficiently performed on the basis of whether the feeding quantity or the remaining quantity set in advance for each classification of the components [Wo] has been reached.

When the information processor 202 determines that the processing is efficiently performed (YES), the processing proceeds to step S107. On the other hand, when the information processor 202 determines that the processing is not efficiently performed (NO), the processing proceeds to step S106a.

<Step S106a>

In step S106a, the information processor 202 causes the drive controller 203 to perform in-storage tower orientation adjustment processing. The in-storage tower orientation adjustment processing performed here is processing performed in parallel with the picking processing of the components so that the component can be efficiently retrieved from the storage tower 11 by the component retriever 100.

At this time, the drive controller 203 controls the drive of at least one of the orientation adjusters 30 provided on the storage tower 11 in accordance with the adjustment program extracted in step S103 to perform the in-storage tower orientation adjustment processing. This processing is performed in parallel with the picking processing. When the orientation adjustment processing by the driving of the orientation adjuster 30 is performed in parallel with the picking processing, the in-storage tower orientation adjustment processing in step S106a is only required to be processing in which the drive intensity of the orientation adjuster 30 is temporarily increased.

<Step S106b>

In step S106b, the information processor 202 performs control parameter change processing and overwrites the adjustment program stored in the memory 201. At this time, the information processor 202 increases an adjustment intensity of each orientation adjuster 30 related to the component introduction and orientation adjustment processing in the adjustment program extracted in step S103. Here, increasing the adjustment intensity corresponds to enhancing or increasing the driving intensity of each orientation adjuster 30 or increasing driving time or the number of times of driving. With this processing, in the component introduction and orientation adjustment processing in step S104 to be performed later, the component orientation adjustment processing is performed based on the adjustment program in which the control parameter is changed by overwriting, and the efficiency of the subsequent picking processing is improved.

<Step S107>

On the other hand, in step S107 in which the processing proceeds after determining that the picking processing is efficiently performed (YES) in step S106, the information processor 202 determines whether the feeding quantity of the components [Wo] to the predetermined position [S] has reached a predetermined number. At this time, the information processor 202 determines whether the feeding quantity of the components [Wo] to the predetermined position [S] has reached the scheduled predetermined feeding quantity on the basis of, for example, information from the image sensor 301 (see FIG. 1). When determining that the predetermined feeding quantity has been reached (YES), the information processor 202 ends the processing. On the other hand, when the information processor 202 determines that the predetermined feeding quantity has not been reached (NO), the processing proceeds to step S108.

<Step S108>

In step S108, the information processor 202 determines whether there is a remaining component quantity in the storage tower 11. At this time, the information processor 202 determines whether there is a remaining component quantity enough for picking in the storage tower 11 on the basis of, for example, information from the image sensor 301 (see FIG. 1). When the information processor 202 determines that there is the component remaining quantity (YES), the processing returns to step S107, and the information processor 202 repeats the processing until determining in step S107 that the predetermined feeding quantity has been reached (YES).

On the other hared, when the information processor 202 determines that there is no component remaining quantity (NO), the processing returns to step S104, and the component introduction and orientation adjustment processing is performed. At this bine, when the processing returns to step S104 after passing through the previous step S106b, in the component introduction and orientation adjustment processing performed in the step S104 back again, the component introduction and orientation adjustment processing is performed on the basis of the adjustment program overwritten in the memory 201.

Effects of Embodiment

In the embodiment described above, the orientation of the components in the storage tower 11 and the storage tray 20 is adjusted by controlling the drive of the plurality of orientation adjusters 30 on the basis of the component information of the components to be handled. As a result, regardless of the shape (size) of the components, more components can flow into the storage tower 11 from the storage tray 20, and gaps between the components in the storage tower 11 can be filled to increase the density of the components in the storage tower 11. This makes it possible to efficiently retrieve the components from the inside of the storage tower 11 and to feed the components retrieved regardless of the shape of the components. As a result, versatility of the component feeder 1 can be improved, a space for disposing the component feeder 1 can be reduced without the need to prepare component feeders different for each shape of components, and cost can be reduced.

Although embodiments of the present invention have been described and illustrated in detail, the disclosed embodiments are made for purposes of illustration and example only and not limitation. The scope of the present invention should be interpreted by terms of the appended claims.

What is claimed is:

1. A component feeder comprising:
    a component housing that stores a plurality of components;
    a plurality of orientation adjusters that adjusts an orientation of the components housed in the component housing; and
    a first hardware processor that includes
        a second hardware processor that stores control parameters of the plurality of orientation adjusters, and
        a third hardware processor that controls driving of the plurality of orientation adjusters based on component information related to the components housed in the component housing and the control parameters.

2. The component feeder according to claim 1, wherein the plurality of orientation adjusters includes at least two of same or different types selected from a vibrator that vibrates the component housing, an elevator that raises and lowers a bottom surface of the component housing, a bottom surface changer that changes the bottom surface of the component housing, a side wall changer that changes a side wall of the component housing, and a rectifier rod that freely protrudes into the component housing.

3. The component feeder according to claim 1, wherein the first hardware processor includes a fourth hardware processor that determines a classification of the components based on the component information and extracts a control parameter associated with the classification having been determined from among the control parameters stored in the second hardware processor in association with each classification of the components, and
the third hardware processor controls driving of the orientation adjusters based on the control parameter extracted by the fourth hardware processor.

4. The component feeder according to claim 1, wherein the first hardware processor further includes a fourth hardware processor,
the second hardware processor stores a plurality of adjustment programs associated with each classification of the components,
the fourth hardware processor determines a classification of the components based on the component information and extracts the adjustment programs associated with the classification having been determined from the second hardware processor, and
the third hardware processor drives the orientation adjusters in accordance with the adjustment programs extracted by the fourth hardware processor.

5. The component feeder according to claim 4, wherein the third hardware processor drives an orientation adjuster selected for each classification of the components from among the plurality of orientation adjusters.

6. The component feeder according to claim 1, further comprising a sensor that detects the components located in a component retrieval opening in the component housing, wherein the first hardware processor repeatedly drives the plurality of orientation adjusters base on a signal from the sensor.

7. The component feeder according to claim 6, further comprising a component retriever that retrieves the components housed in the component housing from the component retrieval opening of the component housing and feeds the components to a predetermined position, wherein
the first hardware processor operates the component retriever after driving the plurality of orientation adjusters.

8. The component feeder according to claim 1, further comprising:
a component retriever that retrieves the components housed in the component housing and feeds the components to a predetermined position; and
a sensor that detects a remaining quantity of the components housed in the component housing, wherein
the first hardware processor changes a control parameter of the plurality of orientation adjusters based on a signal from the sensor.

9. The component feeder according to claim 8, wherein the first hardware processor changes the control parameter of the plurality of orientation adjusters based on efficiency of component retrieval from the component housing by the component retriever.

10. The component feeder according to claim 1, further comprising an image sensor, wherein the first hardware processor specifies the component information based on an image acquired by the image sensor.

11. The component feeder according to claim 1, further comprising an operation part that inputs the component information.

12. The component feeder according to claim 1, wherein the component housing includes
a storage tower in which a cylindrical member having a loading opening for the components is erected on a side peripheral wall, and
a storage tray that is disposed around the storage tower and allows the components to flow into the storage tower from the loading opening.

13. The component feeder according to claim 12, wherein the plurality of orientation adjusters is provided in the storage tower and the storage tray.

14. The component feeder according to claim 12, further comprising a component retriever that retrieves the components housed in the component housing and feeds the components to a predetermined position, wherein
the first hardware processor operates the component retriever after driving the orientation adjusters provided in the storage tower and the storage tray.

15. The component feeder according to claim 14, wherein the first hardware processor drives the orientation adjusters provided at least in the storage tower when operating the component retriever.

16. A component feeding method by a component feeder including a component housing that stores a plurality of components, and a plurality of orientation adjusters that adjusts an orientation of the components housed in the component housing, the method comprising storing control parameters of the plurality of orientation adjusters; and controlling driving of the plurality of orientation adjusters by a first hardware processor based on component information related to the components housed in the component housing and the control parameters.

17. A component feeder comprising:
a component housing that stores a plurality of components;
a plurality of orientation adjusters that adjusts an orientation of the components housed in the component housing;
a first hardware processor that controls driving of the plurality of orientation adjusters based on component information related to the components housed in the component housing; and
an operation part that inputs the component information.

18. The component feeder according to claim 17, wherein the plurality of orientation adjusters includes at least two of same or different types selected from a vibrator that vibrates the component housing, an elevator that raises and lowers a bottom surface of the component housing, a bottom surface changer that changes the bottom surface of the component housing, a side wall changer that changes a side wall of the component housing, and a rectifier rod that freely protrudes into the component housing.

19. The component feeder according to claim 17, wherein the first hardware processor further includes a fourth hardware processor,
the second hardware processor stores a plurality of adjustment programs associated with each classification of the components,
the fourth hardware processor determines a classification of the components based on the component information and extracts the adjustment programs associated with the classification having been determined from the second hardware processor, and the third hardware processor drives the orientation adjusters in accordance with the adjustment programs extracted by the fourth hardware processor.

\* \* \* \* \*